United States Patent [19]

Finney, II

[11] 4,441,104

[45] Apr. 3, 1984

[54] GRAPHIC EFFECTS GENERATOR

[75] Inventor: Harold T. Finney, II, Temple City, Calif.

[73] Assignee: Mattel, Inc., Hawthorne, Calif.

[21] Appl. No.: 336,210

[22] Filed: Dec. 31, 1981

[51] Int. Cl.³ .............................................. G09G 1/00
[52] U.S. Cl. .................................... 340/724; 340/725; 340/792
[58] Field of Search ............... 340/724, 725, 726, 792, 340/750, 732, 744

[56] References Cited

U.S. PATENT DOCUMENTS 3,742,482  6/1973  Albrecht et al. ..................... 340/726
3,793,483  2/1974  Bushnell ............................. 340/725
4,129,859  12/1978  Iwamura et al. ..................... 340/724

FOREIGN PATENT DOCUMENTS 2839888  3/1980  Fed. Rep. of Germany ...... 340/726

Primary Examiner—Gerald L. Brigance
Attorney, Agent, or Firm—Roy A. Ekstrand; Ron M. Goldman; James G. O'Neill

[57] ABSTRACT

A central processing unit (CPU) is coupled to a random access memory (RAM) which is organized in correspondence with a cathode ray tube (CRT) type display. The to-be-displayed image is sequentially read from the RAM by a character reader. A reference clock system provides appropriate timing and synchronization signals for CRT scan and memory read out. Means are provided for altering the timing between CRT scan and memory read out in an erratic or psuedo-random manner to produce a scene-shaking effect in the displayed image.

4 Claims, 2 Drawing Figures

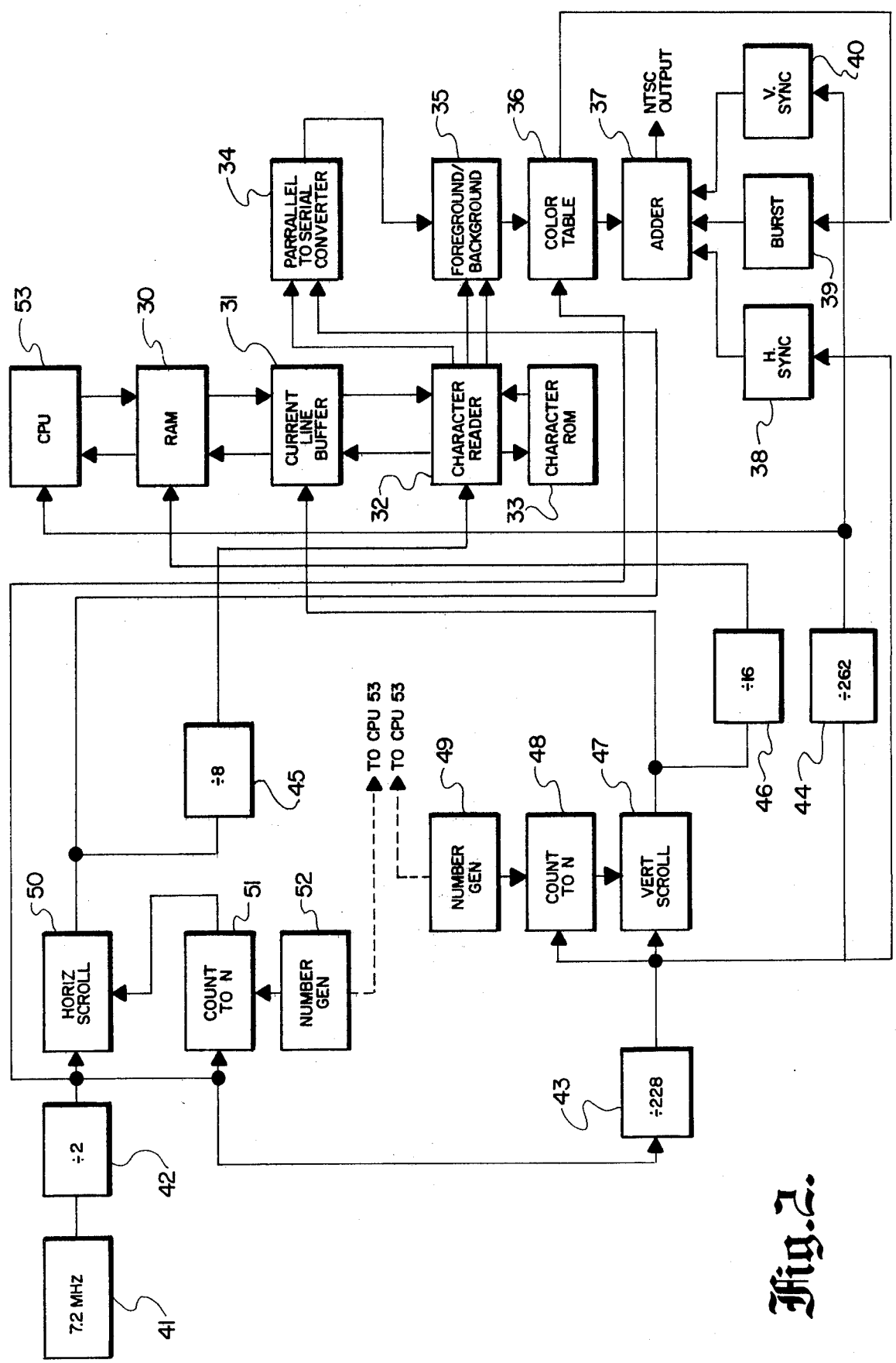

GRAPHIC EFFECTS GENERATOR

BACKGROUND OF THE INVENTION

This invention relates generally to computer control display systems used in combination with a raster scan display, and particularly to those used in playing video arcade and video games played in combination with a television receiver.

Raster scan display terminals used in combination with computer systems are found in many and varied forms and utilize different systems approaches. However, all may be said to include the basic system components of a display such as a cathode ray tube (CRT) and associated circuitry operating thereon which provides two dimensional sequential scan of the CRT image forming surface together with appropriate circuitry for applying an intensity modulation signal to the swept CRT beam. Whatever the general intended use of such display systems, each must provide for the proper synchronization or timing of the information communication from the computer system to the intensity modulation circuits of the display and raster scan. The information communication and raster scan of the display must be synchronized or properly timed to assure that a coherent image is properly placed upon the image forming surface.

The uses afforded CRT display systems and the like are many, ranging from character generators in computer interactive systems to special effects graphic generators used in photographic and artistic activities to arcade games and home video games playable in combination with a conventional home television receiver.

The latter application, that is home video games, had its origin in relatively simple "ping-pong" type games in which an essentially dark raster was provided through pulse timing and counting circuits with an operator controllable pair of "paddles" and a ball image. Such early systems were relatively unsophisticated and were not designed to take advantage of the then emerging computer technology arts. With the advent of relatively inexpensive microprocessor computer electronics technology, the more modern and more sophisticated home video games systems of the type now presently available emerged. Such systems not only provided for more complex play and more artistically intricate play objects than the previous pong-type games, but also provided the ability to depict a setting or background scene in addition to moveable play image objects.

Together with scene and setting depiction found in more sophisticated video games, there have evolved systems in which the scene depiction is used to impart apparent motion of either the viewer, player, or the relative foreground and background image portions of the play scene.

While such modern sophisticated home video games provide great utility and flexibility in scene depiction and the imparting of the visual effect of scene motion, and the corresponding graphic effects generators utilizing similar technology in the graphic interaction arts briefly mentioned above, there remains a need in the art for increased flexibility of special effects generation to heighten interest realism and drama. In particular a need exists in the in video games for improved capability in the creation of special graphic effects.

OBJECTS OF THE INVENTION

Accordingly, it is a general object of the present invention to provide an improved graphic effects generation system for use with computer operated display systems. It is a more particular object of the present invention to provide an improved special effects generation system which has particular advantage in the home video game applications.

SUMMARY OF THE INVENTION

A computer display system in which an image forming surface is scanned in first and second directions to produce a raster includes a graphic effects generating system producing background information images on a display in synchronism with the raster scan together with means for timing the information transfer from the computer to the image control circuit of the display system to properly place the image thus formed upon the image forming surface of the display and means for graphically depicting a violent occurrence in and about the formed image by rapidly off-setting the timing system in at least one direction in a pseudo-random manner to effect rapid erratic shaking of the depicted image.

BRIEF DESCRIPTION OF THE DRAWINGS

The features of the present invention which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 2 is a more detailed block diagram of the present invention graphic effects generating system.

DESCRIPTION OF THE PREFERRED EMBODIMENTS

Figure 1:
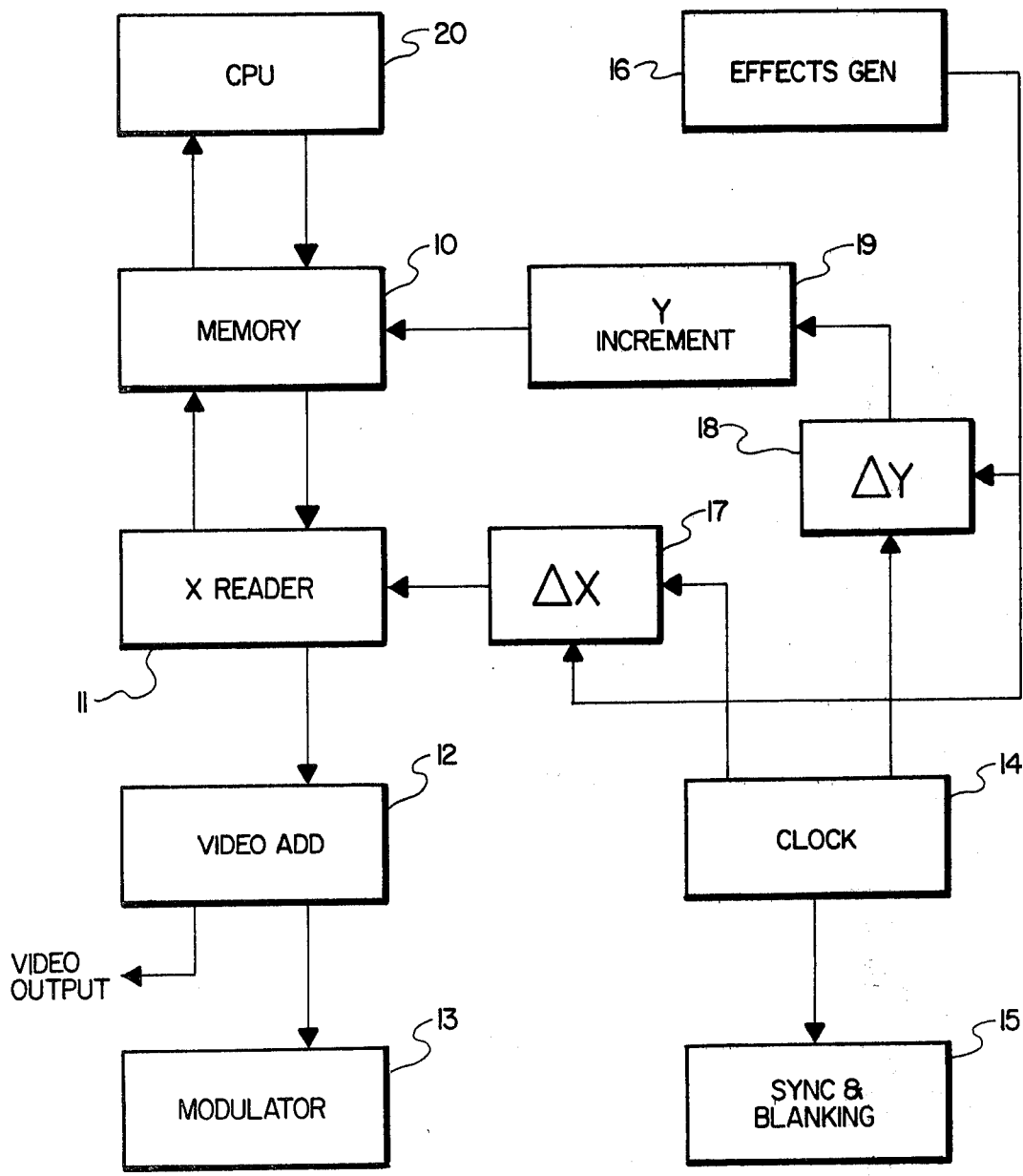
FIG. 1 is a block diagram of a basic computer display system having the special effects generator of the present invention.

FIG. 1 sets forth a block diagram depiction of the overall system of a special effects generator constructed in accordance with the present invention. A memory 10 is coupled to an X direction reader 11 which in turn is operatively coupled to a composite video adder 12. The output of composite video adder 12 is coupled to a television signal modulator 13. A central processing unit 20 is operatively coupled to memory 10. A system clock 14 is coupled to a synchronization signal and blanking signal generating system 15 the output of which is coupled to composite video adder 12 and to an X displacer 17 and a Y displacer 18. The output of X displacer 17 is coupled to X reader 11 and the output of Y displacer 18 is coupled to a Y incrementor 19. The output of Y incrementor 19 is coupled to memory 10. A graphic effects generator 16 is coupled to X displacer 17 and Y displacer 18.

Memory 10 is constructed in accordance with well-known fabrication techniques and comprises a random access memory (RAM) of sufficient storage capacity to provide a storage portion or cell for each picture element (pixel) or group of pixels ultimately displayed on the image forming surface of the CRT. The storage positions withim memory 10 are organized in a manner corresponding to the arrangement of pixel elements upon the image forming surface of the CRT. In simplest form, memory 10 comprises a random access memory having a number of storage cells or bits available in a one-to-one correspondence to pixel elements displayed on the CRT. In such a system, a plurality of binary digits (i.e. "ones" and "zeros") stored within the storage portions of memory 10 forms a latent to-be-displayed image. In more complex systems, the information in each storage portion corresponding to a pixel element or group of pixels of the display comprises a multi-bit binary word coded which defines the characteristics of that particular pixel or pixel group. As will be discussed below, the readout of the memory in such systems requires the use of an intermediate look-up table to translate the binary-coded information into the respective picture components which comprise the image constructed for each pixel or pixel group. In still more complex systems, such as that set forth below in FIG. 2, various binary-coded information words are arranged in memory 10 in a manner corresponding to groups of pixel elements on the ultimately formed image. As will be discussed below in greater detail, the intervening look-up table includes a plurality of stored characters and associated character identifications signals. The complexity of such systems will be described below in greater detail. However, suffice it to say here that memory 10 comprises a stored image corresponding in organization to the pixel element groups and contains the picture information ultimately portrayed in the display image.

X reader 11 is operatively coupled to memory 10 and includes circuitry which sequentially clocks out or reads out successive memory locations within memory 10 in response to an applied clocking signal. Y increment 19 is operatively coupled to memory 10, however, it will be apparent to those skilled in the art from the descriptions which follow that depending upon the addressing system ultimately used for memory 10, Y increment 19 may in some cases be coupled to portions of X reader 11. In either event, the important functional aspect to be understood is that Y increment 19 causes X reader 11 to advance through succeeding horizontal scan lines as each horizontal line of memory 10 has been read to completion. As mentioned, both X reader 11 and Y increment 19 respond to applied clock-type signals. Such signals are ultimately generated by clock 14 which provides a frequency standardized signal or group of signals at the scan frequencies used in television receivers. In its simplest form, clock 14 comprises an oscillator circuit frequency standard running at a pre-determined frequency and producing a corresponding periodic signal having a frequency equal to or greater than the highest signal required in the scanning system. Thereafter, a plurality of frequency dividers are utilized to derive the frequency signals required. Such signals comprise the horizontal and vertical raster scan, synchronization signals and so on.

Because it is necessary to synchronize the X and Y direction reading of memory 10 and the scan of the CRT display system or television receiver, the output of clock 14 generates signals which control both raster scan and synchronization signal production. In this manner, both the reading of memory 10 and synchronization signal generation are derived from the same clock and their timing correspondence for proper placement of the information read from memory 10 upon the CRT display is assured.

Composite video adder 12 contains well known circuitry for combining the picture information, read from memory 10 by sequential reading of X reader 11, and the applied horizontal and vertical scan rate synchronization and blanking signals forming a television signal commonly known as composite video and sync. Modulator 13, which is utilized in systems operable in combination with conventional television receivers, includes well-known circuitry for modulating the composite video and synch signal upon an appropriate television station carrier. As a result, the output of modulator 13 may be coupled to the antenna imput terminals of a television receiver.

In operation, ignoring for the moment of the functions of X displacer 17, Y displacer 18, and effects generator 16, oscillator 14 controls sequential reading of each memory position in a horizontal line of memory 12 to occur in synchronism with the ultimate raster scan. As each memory position is read by X reader 11, a portion of the composite video required for information or image display for successive corresponding pixel elements is applied to composite video adder 12. Y increment 19 includes either frequency conversion circuitry or a reset counter both of which are well within the perview of those skilled in the art. At the completion of each horizontal line scan of memory 10, thereafter Y increment 19 advances the location of X reader 11 operation within memory 10 to cause X reader 11 to reset to the beginning of the next horizontal scan line. This process continues repetitively until a complete scan of memory 10 corresponding to one complete field of a television CRT display picture has occurred. Thereafter, Y increment 19 and X reader 11 reset to the beginning position of memory 10 corresponding to the upper left corner of the image and proceed as before.

Central processing unit (CPU) 20 has not thus far been mentioned in discussions. It will be apparent to those skilled in the art that if a single image is to be displayed, that image once stored within memory 10 will not require further interaction between central processing unit 20 and memory 10. However, more commonly the image stored within memory 10 will be periodically altered or updated by operation of central processing unit 20. While it is not pertinent to the present invention as to the manner in which central processing unit 20 interacts with memory 10 to alter the stored image therein, several possibilities will be immediately suggested to those skilled in the art. For example, central processing unit 20 may be pre-programmed to periodically alter the image stored within memory 10 to provide a "slide-like" presentation of successive images. Similarly, central processing unit 20 may comprise a portion of a computer interactive system in which operator commands are translated by processor 20 to selectively alter portions of the image stored within memory 10. The latter situation is much more common to computer data terminals, special effects graphic terminals, and home video or arcade display games. In any event, it will be understood by those skilled in the art that CPU 20 includes a stored program which assures that the interaction of CPU 20 and memory 10 does not interfere with or upset the previously described scanning functions.

Turning now to the operation of special effects generator 16, X displacer 17 and Y displacer 18, it should be noted that effects generator 16 is representative of an operative coupling in which the described special effects set forth below are initiated. X displacer 17 is representative of numerous types of devices which employable to perform the basic function of altering the location to which X reader 11 addresses memory 10 at any given time. In simplest form, X displacer 17 includes circuitry for simply inhibiting the application of the required clock signals from clock 14 which cause X reader 11 to sequentially read storage positions within memory 10. In more complex forms, such as those set forth below, X displacer 17 further includes systems for causing X reader 11 to skip selected picture portions of memory 10 and thereby begin X increment reading of memory 10 at a position other than that corresponding to the "left most." In the former case the resulting alteration of X reader timing will cause the image read from memory 10 to appear displaced to the right in the ultimately portrayed image under the assumption that the CRT scan progresses in the horizontal direction from left to right (with respect to the viewer). As can be seen, the magnitude of shift caused by operation of X displacer 17 corresponds to the number of display positions within memory 12 which are scanned during the time interval of such activity. In similar manner, Y displacer 18 is operative upon Y increment 19 to alter the timing of reading memory 10 in relation to oscillator 14 and ultimately the scan of the CRT display by a selected number of scan lines. Similar to X displacer 17, Y displacer 18 may in its simplest form interrupt of the transmission of clock signals from clock 14 to increment 19 and therefore cause a delayed or downwardly shift image upon the CRT display. This assumes, of course a conventional CRT display in which vertical scan progresses from top to bottom.

Special effects generator 16 will be described below in greater detail, suffice it to say here however for purposes of overall system examination, effects generator 16 provides appropriate numbers to X displacer 17 and Y displacer 18 which control the degree of shifting in the to-be-displayed image. Thus, the application of number 2 to each will cause the displayed image to be shifted downward by two horizontal scan lines and to the right by a corresponding distance. By further example, the application of the number 4 to X displacer 17 and 3 to Y displacer 18 will cause respective shifts of 3 picture elements to the right and 4 scan lines in the downward direction.

In accordance with an important aspect of the present invention, generator 16 possesses the capability to rapidly apply a sequence of numbers to displacers 17 and 18 in a manner that produces correspondingly rapid shifts in the to-be-displayed image upon the CRT. Thus, there occurs in response to the actions of generator 17 and displacers 17 and 18 erratic sudden shifts in succession of different amounts in the to-be-displayed image.

In addition to random number displacements, a more dramatic effect results if generator 16 is programmed to produce a sequence of numbers which increase as the effect continues. It will be apparent to those skilled in the art that numerous displacement sequences can be created.

As will be described below in greater detail, the operation of effects generator 16 and displacers 17 and 18 provide a dramatic "earthquake-like" effect in which the entire scene or display image is violently and erratically shaken duplicating a very dramatic visual occurrance. As will also be apparent to those skilled in the art, this effect as well as similar effects using different number sequences provides an increased level of drama and play interest.

FIG. 2 sets forth a display system constructed in accordance with the present invention in which a color image is displayed. A background random access memory (RAM) 30 is coupled to a current line buffer 31 which in turn is coupled to a character reader 32. A character read only memory (ROM) 33 is also coupled to character reader 32. Character reader 32 is further coupled to a parallel to serial converter 34 and is further coupled via two information lines to a color processing circuit 35, the output of which is coupled to a color generator look-up table 36. A central processing unit 53 is operatively coupled to RAM 30. The output of color table generator 36 is coupled to an adder circuit 37 and to a color burst generator 39. The latter is coupled also to adder 37. A horizontal synchronization signal and blanking signal generator 38 is coupled to adder 37 and a vertical synchronization and blanking signal generator 40 is also coupled to adder 37. A system clock 41 is coupled to a frequency divider 42 the output of which is coupled to a frequency divider 43 and a horizontal scroll 50. The output of divider 42 is also coupled to color generator table 36 and to a count to N counter 51. The output of the latter is coupled to horizontal scroll 50. A number generator 52 is coupled to counter 51. The output of frequency divider 43 is coupled to horizontal sync generator 38, to frequency divider 44, to count to N counter 48 and to vertical scroll 47 which in turn is coupled to current line buffer 31 and frequency divider 46. Frequency divider 44 performs a 262 frequency division and is coupled to verticle sync and blanking generator 40 and CPU 53. The output of count to N counter 48 is coupled to vertical scroll 47. A number generator 49 is coupled to count to N counter 48. The output of horizontal scroll 50 is coupled parallel to serial converter 34 and to frequency divider 45. The output of divider 45 is coupled character reader 32.

RAM 30 comprises a plurality of storage locations, each capable of storing a multi-bit binary-coded information word, organized in correspondence to the to-be-displayed image. The memory locations within RAM 30 are organized in twelve lines each comprising 20 information storage locations which are referred to as cards. Each "card" defines an 8 by 8 pixel element group which each pixel element corresponds to two horizontal scan lines of a conventional color television receiver. In other words, each card in RAM 30 comprises an area of the to-be-displayed image which is sixteen horizontal scan lines high and an approximately equal distance long. The "aspect ratio" of pixel cards is approximately unity, however, this may be varied to adjust the width of the image. In the present embodiment, twenty cards per line are used making each card width equal to one-twentieth of the image forming area utilized in the display system. The use of twelve lines of cards each comprising sixteen horizontal scan lines results in a total within RAM 30 of 192 scan lines. Because the conventional NTSC scanning system utilizes $262\frac{1}{2}$ horizontal scan lines to form each field every sixtieth of a second a substantial border or mask above and below the stored image when displayed upon a conventional NTSC scanning receiver results. The information contained in each of the 20 cards in each horizontal row of cards comprises a binary-coded word of information which as will be seen below identifies the particular character which is to be displayed during the image portion corresponding to that card. In other words, the information in one row of cards in RAM 30 is twenty binary information words each of which identifies the specific 8 by 8 pixel matrix character to be displayed during the sixteen horizontal scans of the display system corresponding to that row of cards.

Character RAM 30 comprises a memory in which each and every character, that is each potential display element corresponding to a card size portion of the to-be-displayed image displayable by the system is stored in a binary or dot matrix form. Since each character is defined by 8 rows of 8 pixel elements, 64 pixels form a character. While the system will be described in greater detail, understanding is enhanced if the reader visualizes that as each portion of a horizontal scan line is being derived, the to-be-displayed character for that portion of the horizontal scan line has been defined by the coded word in background RAM 30 and has been located within ROM 33. At the start of each field during the first horizontal scan, the first row of cards are simultaneously read out by character reader 32 and loaded into current line buffer 31. Once a horizontal line of cards has been temporarily stored in current line buffer 31, the fifteen scan lines which comprise the first row of cards may be read from current line buffer 31 rather than background RAM 30. This operation is performed in order to free background RAM 30 for interaction with central processing unit 53. It should be apparent, however, that if this freeing up of background RAM 30 for other system interaction is not required, current line buffer would not be needed and the system could directly access RAM 30 on a repeated basis. In synchronism with horizontal scan of the display, the information word identifying the character to be displayed is read by character reader 32. Character reader 32 in response to the information word for each card accesses the appropriate stored character within RAM 33 and reads out the dot matrix pattern for the appropriate horizontal line from among the sixteen lines in that particular character. That information read out by character reader 32 is transferred in the form of a parallel bit stream to parallel to serial converter 34 in which the parallel stream of dot matrix information is converted to a serial bit stream of information which is, for reasons set forth below, properly timed to horizontal scan of the display and applied to color foreground-background switch 35. In addition to reading the proper horizontal line of character RAM 33, character reader 32 in response to each card read from current line buffer 31 also denotes the information within the binary-coded word therein to determine the background color and foreground color to be applied to the character displayed during each card.

In other words, arriving at color foreground-background switch 35 is a serial bit stream of information derived from the dot matrix within character RAM 33 which distinquishes between the background and foregoing image portions of the to-be-displayed character and the identification of the appropriate color for background and foreground information. It should be noted at this point that each character which forms a picture sub-element of an 8 by 8 pixel group containes three pieces of information. First, the foregoing background information which is very much similar to the luminance portion of a signal, second the color of the foreground portion, and third the color of the background portion. These three information components make up the entire displayable information in each and every card or character. The resulting displayed image is in effect a mosaic of twelve rows of 20 characters each constructed in such manner that together they form the background scene information.

The output of color switch 35 applied to color generator table 36 is an alternatining signal identifying either the background color or foreground color in response to the luminance-like dot matrix signal. The actual signals produced by color switch 35 are binary-coded identifiers of the colors to be displayed. Color generating table 36 decodes the binary information words for foreground and background color information and produces a correspondingly phased 3.58 MHz color sub-carrier signal corresponding to the color video signal for each foreground and background portion. Color generating table is in essence a look-up table circuit receiving a binary coded word and outputting a corresponding color signal. The output of color generator table 36 is combined within adder 37 with locally generated horizontal sync and blanking signals produced by conventional means in sync generator 38, a reference color burst produced by conventional generating systems within burst genrator 39, and vertical syncronization and blanking signals produced by conventional system within means by vertical sync generator 40. The resulting combination forms an output signal which very closely approximates the NTSC composite color video signal.

As can be seen from the foregoing, a considerable amount of appropriate timing and sequencing of information transfer within the described system is required to produce a coherent properly phased and timed image display. Turning now to the timing system, clock 41 provides a frequency stable source of signal at approximately 7.2 MHz which is divided by two in divider 42 to produce a signal corresponding to the color sub-carrier signal (i.e. approximately 3.58 MHz). The color sub-carrier signal thus produced provides a source of color sub-carrier for color generator table 36. Ignoring for the moment the operation of horizontal scroll 50 the color sub-carrier signal is further applied to parallel to serial converter 34. It is a convenience of the system that the color sub-carrier rate forms an appropriate measure of pixel element width in the horizontal scan direction. Accordingly, the dot matrix or "luminance-like" information derived by character reader 32 from ROM 33 in parallel bit form is sequentially incremented out of parallel to serial converter 34 at the rate of the color sub-carrier. In addition, the color sub-carrier after a frequency division of eight by divider 45 is applied to character reader 32. The division by eight of the color sub-carrier provides a signal which corresponds in image "width" of each card of background RAM 30. In other words, the clocking of character reader 32 by signal having a frequency of one-eighth that of a color sub-carrier produces the proper timing for changing one card (or information word) to another during the course of horizontal display scan. Simply stated, each time a signal arrives from divider 45 at character reader 32, it ceases to scan the previous character in ROM 33. Instead it examines the identifying word in current line buffer 31 for the next information card and begins scan of that corresponding character within ROM 33. When twenty such signals have been received by character reader 32 it returns to the initial card in current line buffer 31.

Returning again to the output of frequency divider 42, the output signal at the color sub-carrier frequency is divided by a factor of 227 in frequency divider 43 to provide a signal which corresponds to the horizontal scan frequency of the system. This signal is applied directly to horizontal sync and blanking generator 38 and forms the reference input for timing the production of horizontal sync and blanking signals. The horizontal scan rate signal derived by frequency divider 43 is also applied to current line buffer 31. The purposes for horizontal scan rate signal application to line buffer 31 is to cause scan of successive horizontal lines in each of the cards stored therein. In other words, as successive cards are scanned during each portion of display horizontal scan the appropriate word is applied to character reader 32 after 20 such words have been read out, the next arriving signal from frequency divider 43 causes current line buffer 30 to read out the next group of twenty words which is of course a repeat of previous words. This process repeats until the full compliment of sixteen scan lines in the line of twenty cards stored in current line buffer 31 has been read out at which time the output of frequency divider 46 which divides the signal frequency by a factor of sixteen applied to background RAM 30 causes the next line of cards to read into character reader 32 and stored in current line buffer 31. Thereafter, the scan and read-out process continues. The output of frequency divider 43 that is the horizontal scan rate signal is further divided by a factor of 262 in frequency divider 44 to produce a signal corresponding to the vertical scan rate of the system. This signal is applied to vertical sync generator 40 and serves as the reference input for production of vertical synch and blanking signals. In addition, the vertical scan rate signal is applied to background ROM 33. At the occurrance of each vertical scan rate signal the reading out of background RAM 30 is returned to the top horizontal scan line of the first row of cards.

In addition, the vertical rate signal applied to background RAM 30 may also be used to inform the central processing unit 53 that an appropriate period for alteration of the image identifying words in RAM 30 is at hand (i.e. the vertical retrace period). This permits central processing unit 53 to alter the stored image between displayed fields and theefore insures that the image display system is not confused by central processor units input to RAM 30.

The system thus far described in FIG. 2 with the exception of vertical scroll 47, count to N counter 48, number generator 49, Horizontal scroll 50, count to N counter 51 and number generator 52 is known in the art and fulfills the need of timing the application of image information to the display and display scan to properly place the image upon the display surface.

Turning now to the present invention graphic effects generator attention in initially directed to the combination of Horizontal scroll 50, count to N counter 51 and number generator 52. It should be noted at the outset that Vertical scroll 47, count to N counter 48 and number generator 49 form an identical combination and operate in the same manner.

In effect, the two combinations taken together perform the basic function described generally in FIG. 1 as elements 16, 17 and 18 which is in essence to "reposition" the image upon the display surface in one or both scan direction as a function of a displacement number.

As will be recalled horizontal scroll 50 is interposed between divider 42 and both parallel to serial converter 34 and divider 45. Horizontal scroll 50 comprises an AND gate which provides an output logic change when both inputs are simultaneously applied. Count to N counter 51 is also constructed in accordance with known techniques and operates to count applied signals and produces an output each time the count reaches the designated number "N". Number generator 52 provides an output number "N" which is applied to counter 51. A dashed line coupling to CPU 53 from generator 52 indicates that CPU 53 controls the number produced by generator 52. It will be apparent to those skilled in the art that generator 52 can without departing from the present invention be otherwise controlled as for example direct keyboard access.

In operation, a number originating in the stored program within CPU 53 is applied to generator 52 which sets the "N" for counter 51. Under normal circumstances, no image displacement is desired and the "N" value set in counter 51 is zero. In such case the output of counter 51 remains high and horizontal scroll 50 couples each signal pulse to divider 45 and converter 34 uninterrupted. The system performs as set forth above and no horizontal image displacement is required, a non-zero number is applied to generator 52 which in turn sets the N value of counter 51 accordingly. Thereafter the N value number of pulses from divider 42 are required before counter 51 will enable horizontal scroll 50 and cause it to again couple signals to divider 45 and converter 34. If for example, CPU 53 applies a number 2 to generator 52, counter 51 is set to 2 and scroll 50 will "block" two successive pulses from being applied to divider 45 and converter 34. On the third pulse, pulses will again be coupled by scroll 50 to divider 45 and converter 34. Because the operation of horizontal sync generator 38 is not similarly affected, the image information will be displaced to the right with respect to the image producing surface (assuming left to right display scan). It should be noted that CPU 53 must provide non-zero N value numbers to generator 52 only at the beginning of horizontal scan of the entire image is to be shifted as a unit.

As can be seen, a shift of two increments to the right is accomplished by applying the N value "Z" to generator 52 at the start of each horizontal scan for one or more complete raster fields (i.e. all 262 lines). Thereafter, the application of zero returns the image to normal placement or application of another number produces a different right word shift. By way of illustration, the numbers 0, 2, 4, 6, 8, 0 applied for several fields each and repeated for several sequences will produce a right word "shaking" of the image which increases periodically in magnitude. Of course, nearly endless number sequences can be used.

Vertical scroll operates upon the signal coupled from divider 43 to current line buffer 31 and divider 46 in a manner similar to that of horizontal scroll 50. The operations of counter 48 and number generator 49 also correspond to those of counter 51 and generator 52. As mentioned above, the output signal of divider 43 comprises the horizontal scan rate signal of the system and controls both the reading out of RAM 30 and the production of display scan sync signals.

During normal operation, that is no vertical image displacement desired, CPU 53 applies a zero to generator 49 causing coutner 48 to enable vertical scroll 47 and no interruption of RAM 30 read out occurs. When CPU 53 reaches a command in its stored program for vertical image displacement a non-zero number is applied to generator 49 and counter 48 is set to a corresponding N value. As a result the N value number of horizontal rate pulses must be counted by counter 48 before vertical scroll 47 again couples signals to divider 46 and current line buffer 31. As was the case for horizontal image displacement, vertical displacement must be timed to the start of a vertical field scan to shift the entire image downward as a unit. Application of the number 3 to generator 49 for example at the start of one or more vertical scan (i.e. just after vertical retrace) delays the read out of RAM 30 for three horizontal scan lines for one or more fields. Because vertical sync and blanking generator 40 is not so delayed, the image is shifted downward three horizontal scan lines.

As will be apparent to those skilled in the art, non-zero number sequences may be simultaneously applied to both generators 49 and 52 (provided appropriate timing is observed) to produce dramatic vertical and horizontal image shift combinations.

The foregoing descriptions set forth a functional description of the preferred embodiment of the present invention. In certain specific computer display systems, the present invention may be carried forward by appropriate combinations of software instructions and circuitry within the existing system. One example of such a system is the General Insturment integrated circuit number AY-3-8900/AY-3-8900-1 as set forth in the General Instrument Microelectronics Data Catalog, 1980, at pages 5-10 et. seq. The circuit described therein is known in the art as a "Standard Television Interface Chip" and is used extensively in providing the interface between computer graphic systems and television displays.

Of particular importance to the present invention are sub-system components within the AY-3-8900 circuit which facilitate image motion. Such components are termed "scroll registers" and provide for depiction of scrolling motion of the image wherein the image is incremented in the desired direction to progressively more the image. In operation, a starting number is provided by the associated central processor to each of the scroll register. Thereafter the starting number is incremented to depict motion.

In the above-described system the present invention is practiced by including within the controlling software program rapid erratic variations of one or both of the scrolling register starting numbers to produce the type of effect sought.

While particular embodiments of the invention have been shown and described, it will be obvious to those skilled in the art that changes and modifications may be made without departing from the invention in tis broader aspects, and, therefore, the aim in the appended claims is to cover all such changes and modifications as fall within the true spirit and scope of the invention.

I claim:

1. A graphic effects generator for use in a computer controlled raster scan display system comprising:
   clock means providing raster scan reference signals;
   display means coupled to said clock means and including an image forming surface and means for raster scan of said image forming surface in two directions responsive to said clock means;
   a memory organized in a plurality of elements each corresponding to regions of said image forming surface and having therein stored information defining an image to be displayed;
   reading means for reading said stored information from said memory and converting said stored information to a displayable image signal corresponding to said image;
   timing means including start number generating means producing a start number for timing the operation of said reading means with respect to said display means to position said image upon said image forming surface and including scroll means coupled to said clock means introducing a delay of raster scan reference which varies as a function of said start number; and
   displacement means operative upon said scroll means for abruptly altering the operation of said timing means by applying randomly varying start numbers to said scroll means to cause erratic shifts of said image with respect to said image forming surface.

2. A graphic effects generator as set forth in claim 1 wherein said display means comprises a cathode ray tube and said means for raster scan includes a horizontal and a vertical scan system.

3. A graphic effects generator as set forth in claim 1 wherein said clock means includes:
   a reference signal clock producing a first periodic signal; and
   frequency converting means responsive to said clock first periodic signal for producing horizontal and vertical scan synchronizing signal.

4. A graphic effects generator as set forth in claim 3 further including a central processing unit having an associated stored program of coded instructions and wherein said displacement means include;
   means generating a series of random numbers; and
   means for applying said random numbers as start number for said scroll means.

* * * * *